Jan. 3, 1961 G. E. RYDBERG ET AL 2,966,898
ROTARY PISTON INTERNAL COMBUSTION ENGINE
Filed Aug. 26, 1957 11 Sheets-Sheet 4

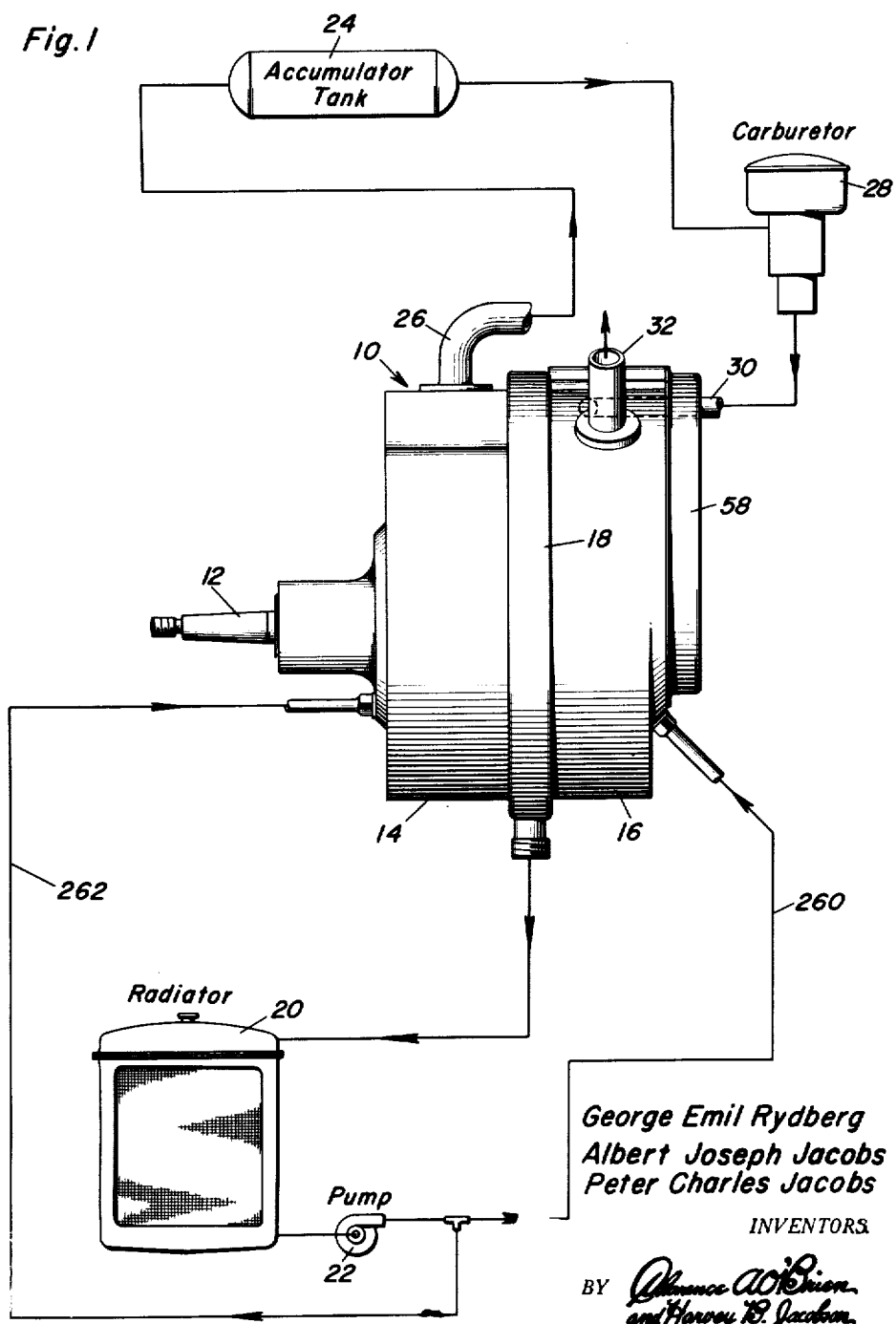

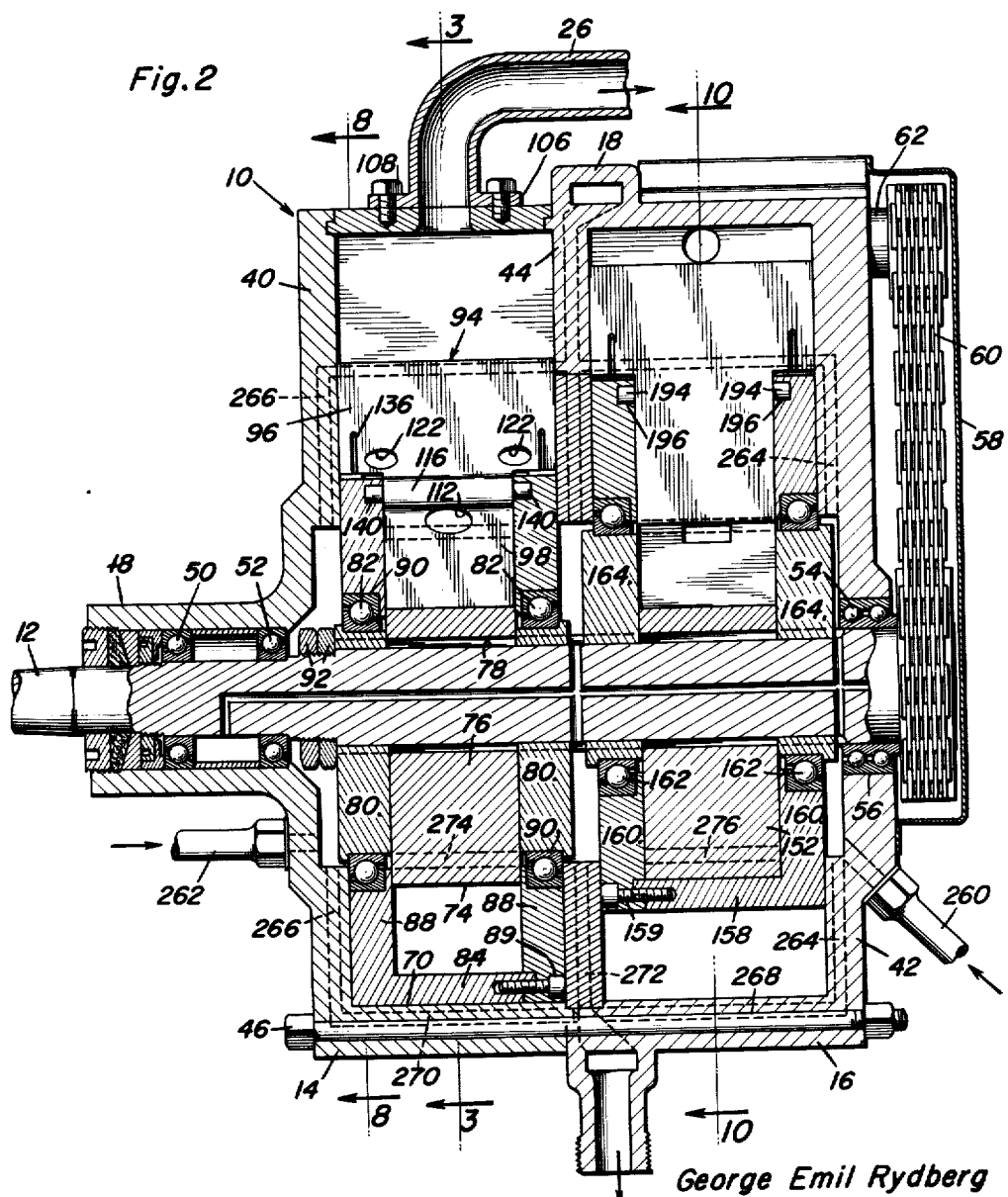

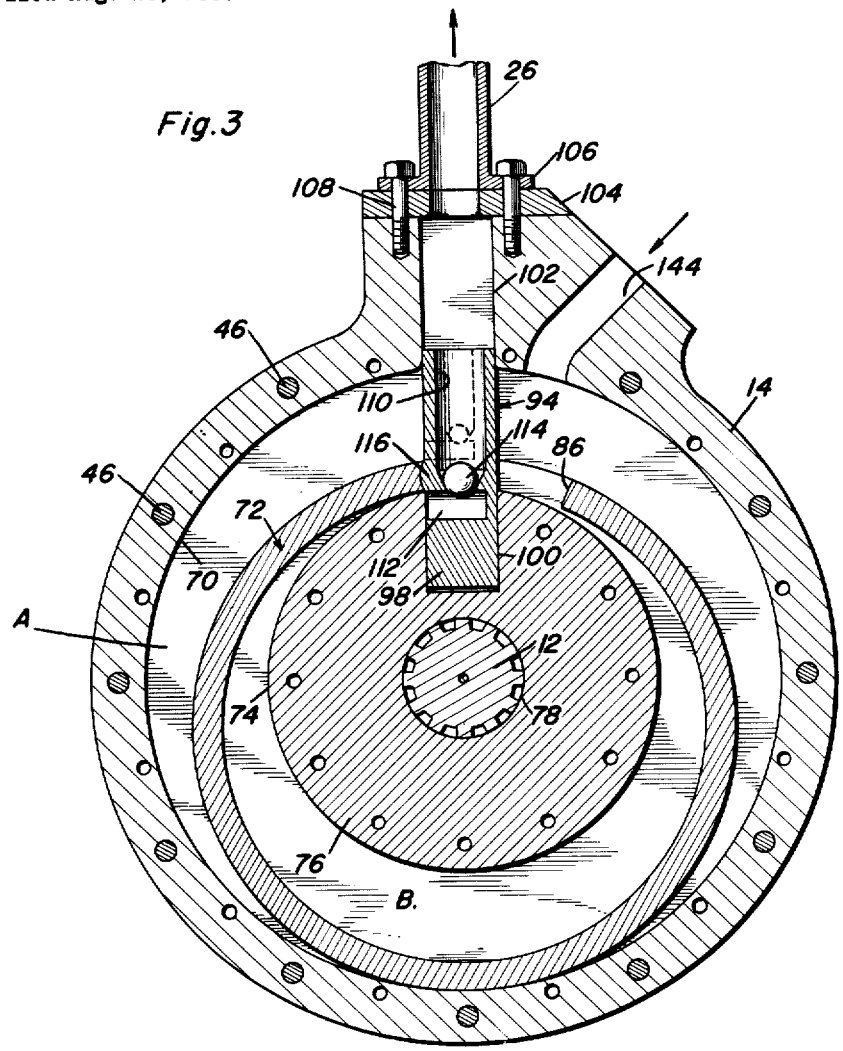
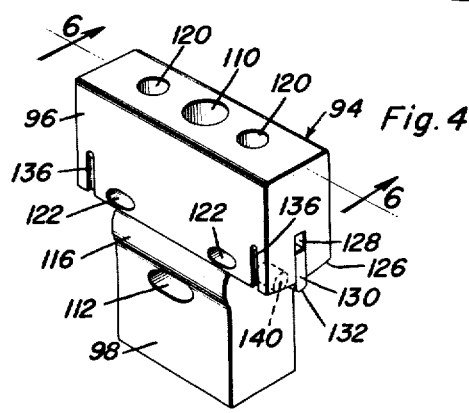

George Emil Rydberg
Albert Joseph Jacobs
Peter Charles Jacobs
INVENTORS.

BY *Clarence A. O'Brien*
*and Harvey B. Jacobson*
Attorneys

Jan. 3, 1961 G. E. RYDBERG ET AL 2,966,898
ROTARY PISTON INTERNAL COMBUSTION ENGINE
Filed Aug. 26, 1957 11 Sheets-Sheet 5

George Emil Rydberg
Albert Joseph Jacobs
Peter Charles Jacobs
INVENTORS

BY Clarence A. O'Brien
and Harvey B. Jacobson
Attorneys

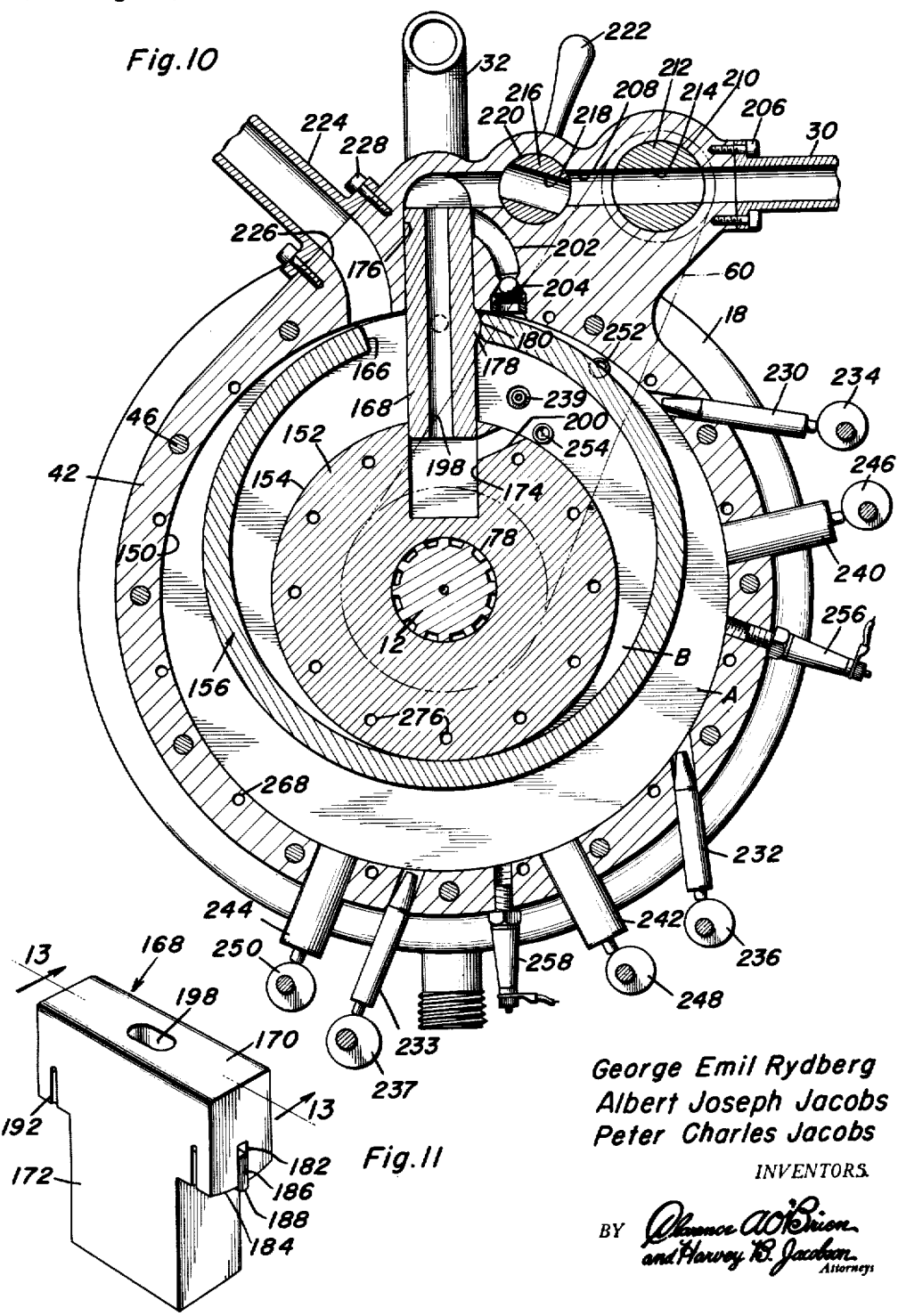

Jan. 3, 1961 G. E. RYDBERG ET AL 2,966,898
ROTARY PISTON INTERNAL COMBUSTION ENGINE
Filed Aug. 26, 1957 11 Sheets-Sheet 7

George Emil Rydberg
Albert Joseph Jacobs
Peter Charles Jacobs
INVENTORS

Jan. 3, 1961  G. E. RYDBERG ET AL  2,966,898
ROTARY PISTON INTERNAL COMBUSTION ENGINE
Filed Aug. 26, 1957  11 Sheets-Sheet 8

George Emil Rydberg
Albert Joseph Jacobs
Peter Charles Jacobs
INVENTORS.

BY *Clarence A. O'Brien*
and *Harvey B. Jacobson*
Attorneys

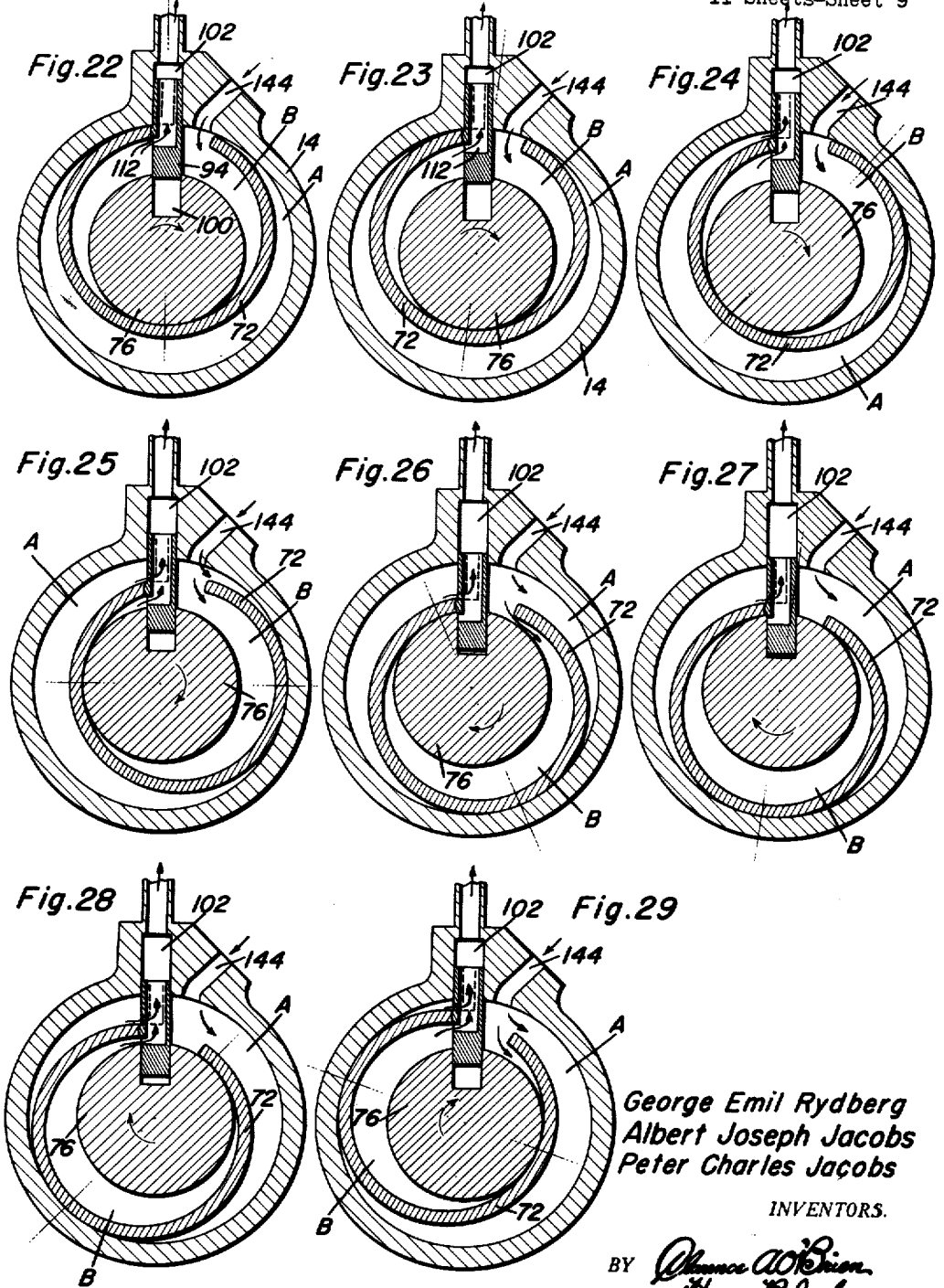

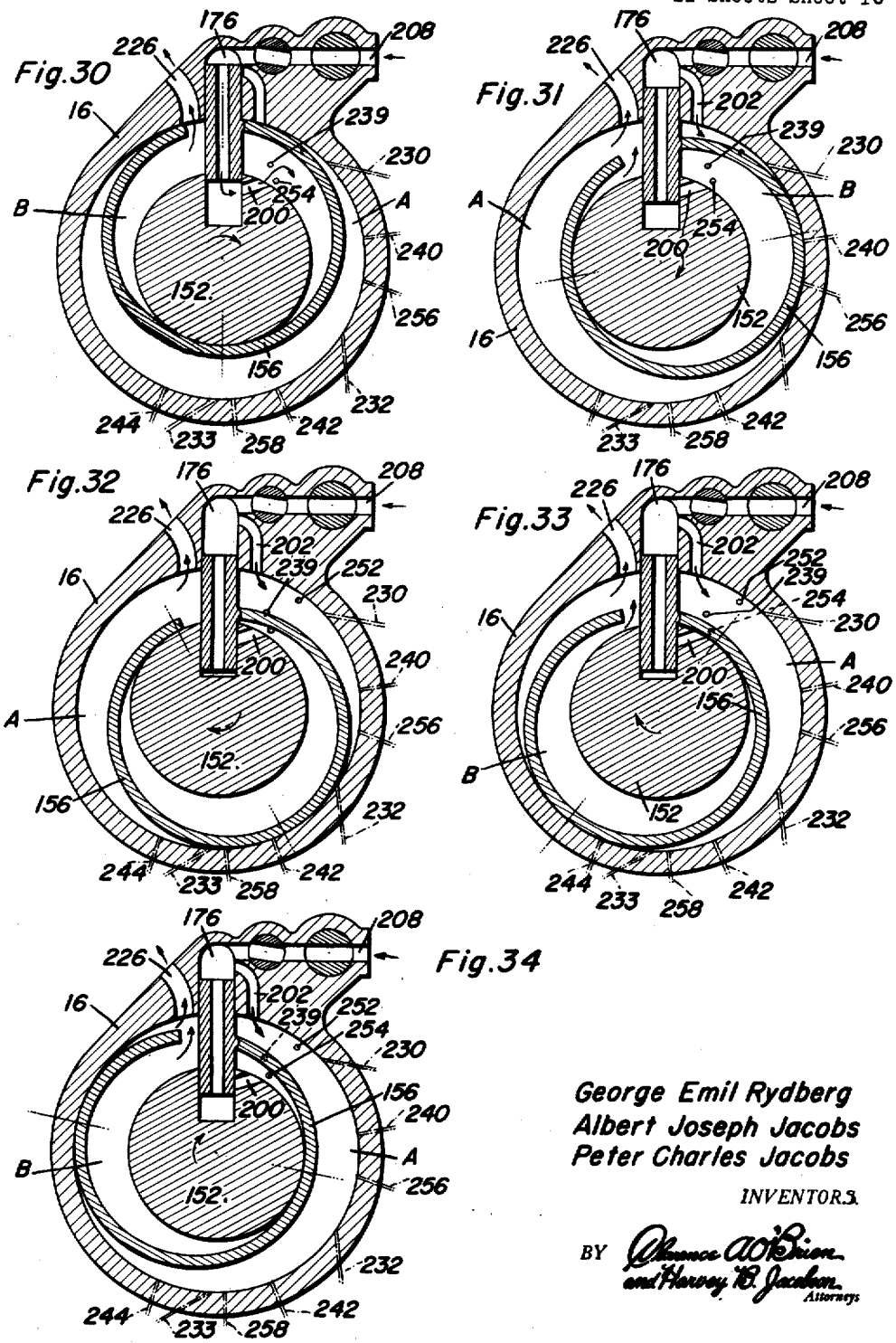

Jan. 3, 1961 G. E. RYDBERG ET AL 2,966,898
ROTARY PISTON INTERNAL COMBUSTION ENGINE
Filed Aug. 26, 1957 11 Sheets-Sheet 11

George Emil Rydberg
Albert Joseph Jacobs
Peter Charles Jacobs
INVENTORS.

BY *Clarence A. O'Brien*
*and Harvey B. Jacobson*
Attorneys

United States Patent Office 2,966,898
Patented Jan. 3, 1961

2,966,898
ROTARY PISTON INTERNAL COMBUSTION ENGINE

George Emil Rydberg and Albert Joseph Jacobs, both of 602 7th Ave. W., Calgary, Alberta, Canada, and Peter Charles Jacobs, 11615 73rd Ave., Edmonton, Alberta, Canada; Mary Caroline Denise Cote, Calgary, Alberta, Canada, executrix of the estate of said George Emil Rydberg, deceased Filed Aug. 26, 1957, Ser. No. 680,260

24 Claims. (Cl. 123—16)

This invention comprises a novel and useful rotary piston internal combustion engine and more particularly relates to a combined compressor unit and an internal combustion engine unit having each a single rotor element accommodated in a single stator.

The principal object of this invention is to provide an internal combustion engine which shall substantially completely eliminate all reciprocating parts for transmitting power from a piston to a drive shaft and substitute therefor a single continuously rotating piston.

A further object of the invention is to provide an engine in accordance with the preceding object which shall include a rotary compressor for compressing a fluid, such as air to be used in the combustion chamber of the engine.

A further object of the invention is to improve the volumetric efficiency of an internal combustion engine in accordance with the preceding objects wherein the useful volume of the working chambers of the pump and engine components shall occupy a very large proportion of the entire volume of the apparatus.

A still further object of the invention is to provide an internal combustion engine in accordance with the preceding object wherein the effective working stroke of the pump and engine components of the device shall occupy a very large proportion of a complete rotation of each of those elements to thereby produce a longer period of delivery by the compressor unit and a longer duration of the power stroke of the engine unit and a more uniform working pressure in the latter.

Yet another object of the invention is to provide an internal combustion engine as set forth in the above mentioned objects in which a simplified and improved intake and exhaust means shall be provided for the pump component and the engine component of the device.

Yet another important purpose of the invention is to provide in an engine of the character set forth in the preceding objects an improved lubricating and cooling means for the device.

A still further important purpose of the invention is to provide an internal combustion engine in conformity with the above set forth objects wherein a single rotary piston shall serve as the impeller means in a pair of concentric working chambers in each of the compressor and engine components of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a diagrammatic view illustrating the various components and elements employed in an internal combustion engine incorporating therein the principles of this invention;

Figure 2 is a vertical longitudinal sectional view through a combined rotary engine and compressor in accordance with this invention;

Figure 3 is a vertical transverse sectional view taken substantially upon the plane indicated by the section line 3—3 of Figure 2 and showing the interior of the compressor unit of the device;

Figure 4 is a perspective view of a blade or partition member forming the cylinder head, or abutment of the working chambers of the compressor;

Figure 10 is a vertical transverse sectional view taken substantially upon the plane indicated by the section line 10—10 of Figure 2 and showing the interior of the engine component of the unit;

Figure 11 is a perspective view of a partition or blade forming an abutment or cylinder head of the engine component of the device;

Figures 22–29 are sequential diagrammatic views illustrating successive stages during one complete rotation of the rotary piston of the compressor unit;

Figures 30–34 are sequential diagrammatic views illustrating successive stages in one complete revolution of the rotor of the rotary piston of the internal combustion engine component of the device;

General assembly of the device

Figure 5:
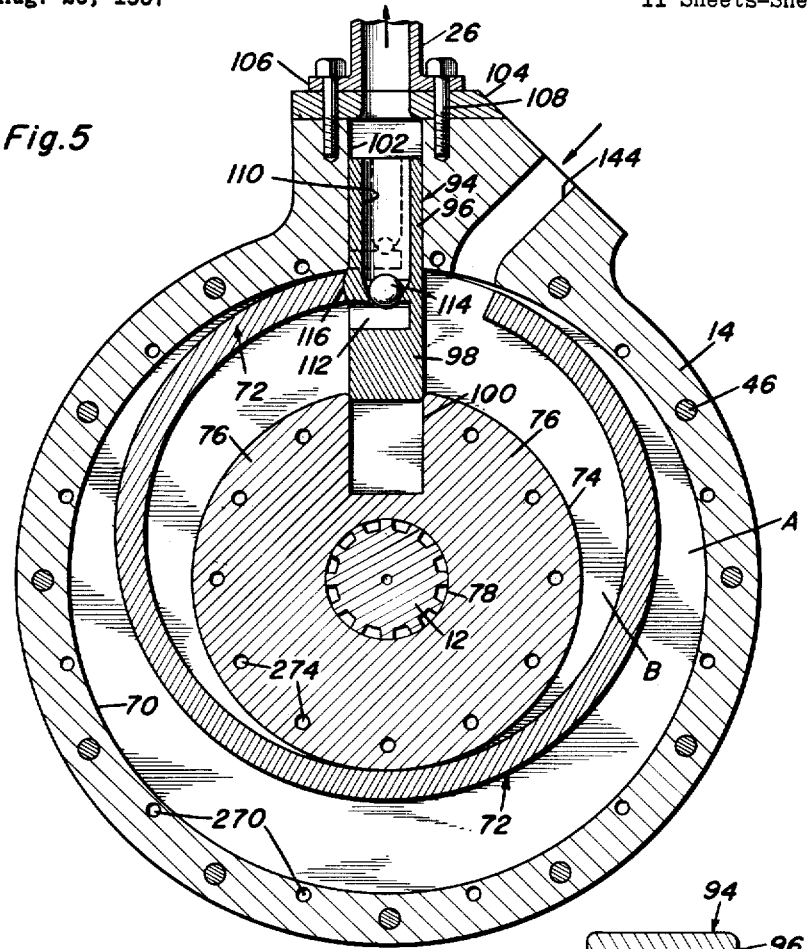
Figure 5 is a view similar to Figure 3 but showing the position of the rotary piston of the compressor when displaced 180° from the position of Figure 3.

Referring first to Figure 1 it will be seen that the general assembly of the apparatus consists of a stator 10 provided with a power shaft 12 disposed centrally thereof and which constitutes the means whereby power is delivered from the engine, the stator including two housing sections of which that indicated at 14 constitutes the stator or housing for the compressor unit while that indicated at 16 comprises the engine stator or housing. Shown at 18 is a circumferentially extending manifold comprising a reservoir for the lubricant and coolant, which in this instance may comprise oil, while a radiator shown at 20 and a pump at 22 are diagrammatically connected to the reservoir and the casing sections for circulating a combined coolant and lubricant therethrough.

The assembly further includes an accumulator or storage tank 24 receiving the discharge from the conduit 26 of the compressor unit, and delivering the compressed fluid to a carbureting device 28 which in turn as by a conduit 30 supplies a charge to the engine unit 16, from which exhaust gases are educted as at 32.

Referring now to Figure 2 is will be observed that the stator 10 comprises front and rear end walls 40 and 42 for the two sections 14 and 16, together with an annular partition 44 carried by one section and disposed between the two sections.

It will be observed that the reservoir or manifold 18 surrounds one of the sections such as the internal combustion engine section 16, and that the partition 44 is likewise carried by the open end of the section 16. Through bolts 46 extend longitudinally through the various sections of the stator whereby all of these elements may be secured rigidly together in their assembled relation.

Projecting centrally forwardly from the end wall 40 is a sleeve or hub 48 receiving a pair of spaced bearing assemblies 50 and 52 by which the front end of the shaft 12 is journaled therein. A similar bearing assembly 54 is provided in an opening 56 in the rear wall 42 for journaling the other end of the shaft, the rear end of the shaft extending into a suitable cover or housing 58, see also Figure 1, where it is connected as by a driving chain 60 or any other timing means with the shaft 62 of a rotary valve forming a part of the internal combustion engine unit, and to be hereinafter described.

*Compressor unit (Figs. 2–9)*

The compressor unit which compresses fluid such as air for introduction into the engine unit of the device is of the same general construction and principles of operation as those of the various forms of compressors, disclosed and claimed in our copending application, Serial No. 664,321, filed June 7, 1957. For a consideration of the form of compressor unit disclosed herein as a component of an internal combustion engine, attention is now directed specifically to Figs. 2–9.

The stator section 14 housing the compressor unit is a cylindrical hollow drum, having a peripheral cylindrical inner wall 70. As shown in Figs. 3 and 5, a rotary piston 72 in the form of an annular band or ring is received in an annular working chamber defined between the wall 70 as its outer periphery and the concentric cylindrical wall 74 which forms its inner periphery and which constitutes the outer periphery of a cylindrical drum comprising a core 76. This core is secured upon and is carried by the shaft 12 which has splines 78 thereon and is held stationary relative to the stator section 14 as described hereinafter.

As so far described, it will thus be seen that there is provided an annular working chamber in the compressor unit lying between the concentric cylindrical surfaces 70 and 74, and which annular chamber is divided by the ring or piston 72 into concentric outer and inner working chambers A and B, respectively.

Referring now again to Fig. 2, it will be seen that a pair of eccentrics each indicated by the numeral 80 is fixedly secured to the splines 78 upon the shaft 12 and are provided with bearing assemblies 82 by means of which the rotor or the rotary piston 72 is carried.

Figure 9:
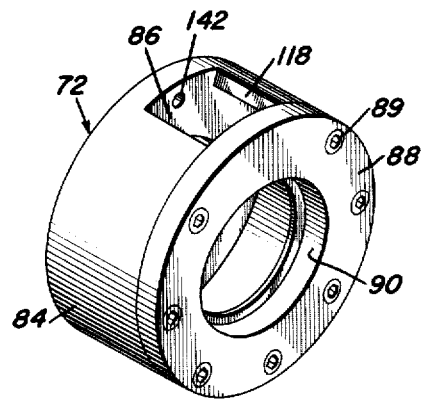
Figure 9 is a perspective view of the rotary piston element of the compressor.

Referring now to Figs. 2 and 9 it will be seen that the rotary piston consists of a cylindrical or annular band or ring 84 having a slot 86 therein and is further provided with and supported by a pair of side or support plates each indentified by the numeral 88. One of the support plates may be integrally formed with the band 84 as shown and one or both may be separately formed and attached thereto in any suitable manner as by bolts 89.

In each support plate there is provided a bearing recess or central aperture 90 for the reception of the above mentioned bearing asemblies 82. The shaft 12 may be provided with suitable lock nuts 92 thereon whereby the assembly of the core 76, and the eccentric members 80 may be firmly secured in fixed relation.

Extending radially across the annular working chamber of the pump unit and through the concentric working chambers A and B thereof is a blade or partition 94. This, as seen best in Fig. 4, consists of a T-shaped, plate-like body having a relatively wide upper portion 96 which projects laterally beyond each side of a depending stem portion 98. The stem portion is slidably received in a radial slot 100 extending across the longitudinal extent of the core 76, as will be apparent from Fig. 2, while the laterally enlarged upper portion 96 is slidably received in a similar slot 102 formed in the stator. The slot 102 is open at its upper end, being provided with a cover or closure plate 104 to which is bolted the flanged extremity 106 of the above mentioned discharge conduit 26, the latter being detachably secured thereto as by fastening bolts 108. The blade thus secures the core non-rotatably to the stator.

Figure 6:
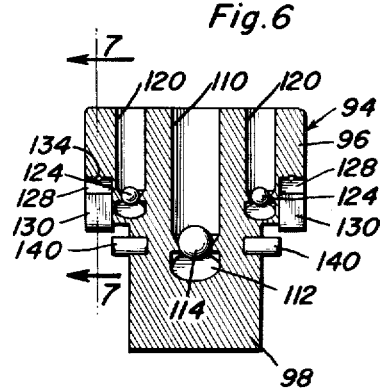
Figure 6 is a vertical transverse sectional view through the blade of Figure 4, being taken substantially upon the plane indicated by the section line 6—6 of Figure 4.
Figure 7:
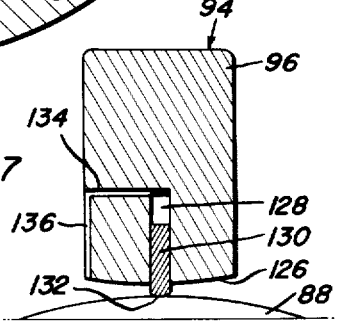
Figure 7 is a detail view taken in vertical section substantially upon the plane indicated by the section line 7—7 of Figure 6.
Figure 8:
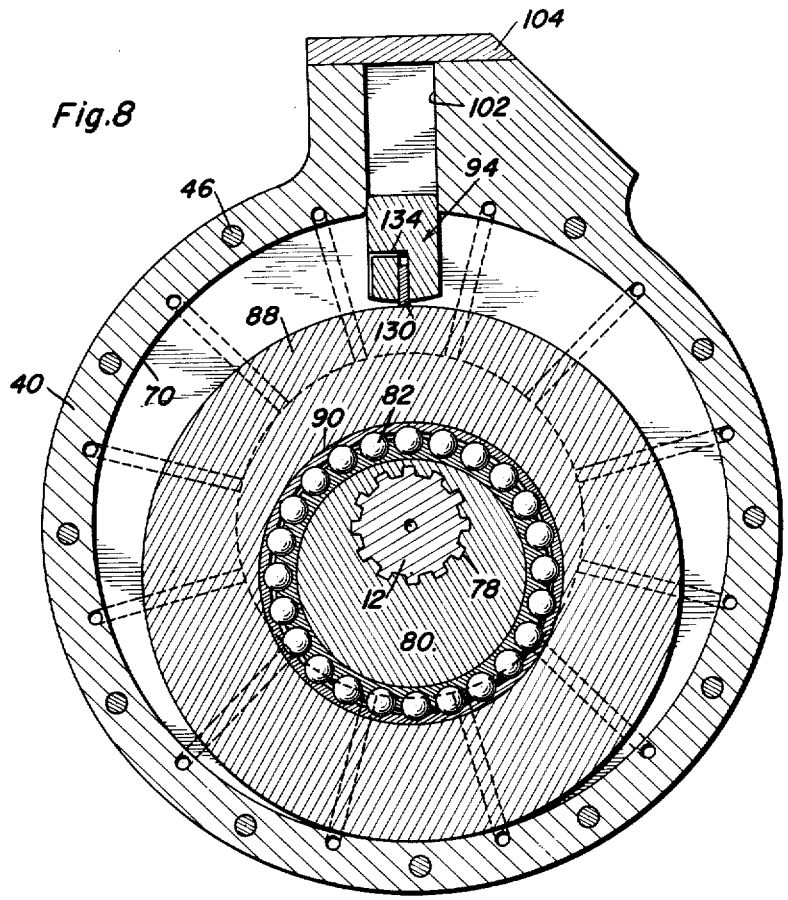
Figure 8 is a vertical transverse sectional view taken substantially upon the plane indicated by the section line 8—8 of Figure 2 and showing the manner of mounting the rotary piston of the compressor.

Referring now specifically to Figs. 4, 6 and 7, it will be seen that the blade 94 which functions also as the discharge or exhaust port means for the outer and inner working chambers A and B of the pump unit, for this purpose has a centrally disposed bore 110 therein opening from its top surface to a position adjacent the lower end of the blade. The lower end of this bore communicates with a cross bore 112 and a non-return ball check valve 114 permits flow from the bore 112 upwardly through the bore 110, but prevents reverse flow therethrough for a purpose to be subsequently apparent.

Just above the cross bore 112, one side of the blade 94 is provided with a semi-cylindrical transversely extending rib 116 which is adapted to receive a semi-cylindrical recess 118, see also Fig. 9, formed in an edge of the slot 86 of the ring 84. The engagement of the rib 116 in the recess or slot 118 provides a pivotal connection between the ring and the blade.

During operation the left edge of the slot 86 of the ring, is always seated against the rib 116, as shown in Figs. 3 and 5 and the ring has a slight pivotal or oscillatory movement with respect to the blade as the contact of the ring with the surfaces 70 and 74 rolls about the annular working chambers A and B.

On opposite sides of the central bore 110, the blade is provided with a pair of additional bores each carrying the numeral 120, and which at their lower ends and just above the junction of the laterally enlarged portion 96 with the stem 98 are provided with cross bores 122 opening to the left side of the blade in the same manner as the cross bore 112. Upwardly opening non-return check valves 124 control the flow of fluid from the bores 122 into and through the bores 120 for a purpose to become subsequently apparent.

As will be best apparent from Fig. 7, the undersurface of the laterally projecting sides of the upper portion 96 of the blade is provided with a slightly convexed surface 126 and a slot 128 opens upwardly from the surface for the reception of a sealing element in the form of a blade or plate 130. The latter in turn has a convex surface 132 which is adapted to rub against the corresponding convex surface of each of the support plates 88 of the ring 72.

From the upper end of each of the slots 128 is a laterally directed bore or passage 134 which in turn communicates with a vertically extending groove or slot 136 opening at its lower end upon the surface 126. This construction permits fluid pressure to enter by the passages 136 and 134 to the slot 128 above the blade 130. It will be observed that by virtue of the contact of the concave surface 132 of the sealing element 130 with the convex surface of the support plate 88, that only one-half of the cross sectional area of the element 130 is exposed to the working or compression pressures prevailing in the annular working chamber to the left of the blade. However the full effects of this pressure is communicated by the passages 136 and 134 to the entire cross sectional area of the blade 130 at the top thereof so that there is a pressure differential urging the element 130 into fluid tight sealing engagement with the support plates.

As will now be understood, the stem portion 98 of the blade extends through the slot 86 in the ring 72. This stem portion has laterally projecting pins 140 which are received in corresponding bores 142, see Figs. 2 and 9, in the support plates 88 to thereby secure the rotary piston or ring in a pivotal manner upon the blade, while the engagement of the semi-cylindrical surfaces 118 and 116 permit a relative pivoting or oscillatory movement of the ring with respect to the blade.

An inlet port 144, see Figs. 3 and 5, is provided in the stator section 14 opening into the outer annular working chamber A at the right side of the blade 94, and serves to supply air or other fluid into the annular working chamber and into each of the concentric working chambers A and B for compression by operation of the rotary piston therein. Thereafter, the compressed fluid in the chambers A and B are forced clockwise therethrough and are discharged through the passage 110 for the chamber B and through the passages 120 for the chamber A, the discharge from both chambers passing upwardly through the blade 94 and through the slot 102 and conduit 26 to the accumulator tank 24 previously mentioned.

At this point it should be mentioned that owing to the pivotal connection of the rotary piston 72 to the blade 94, and the mounting of the blade for radial sliding movement in aligned radial slots in the core and stator, that a combined reciprocatory and swinging movement is imparted to the rotary piston or ring. During this movement the ring has a constant tangent contact with both the surface 70 of the stator and the surface 74 of the core 76, and these contacts move continuously throughout the two annular working chambers.

As will be seen from the sequential views of Figs. 14–21, taken at successive 45° intervals of rotation of the eccentrics 76, the continuous rotary travel of the points of tangency of the ring with the two walls of its annular chamber cause cyclic expansion and contraction of the chambers A and B, as set forth in detail hereinafter in the description of the operation of this apparatus.

The differential pressure seal described hereinbefore in connection with the blade 94 and its elements 130 and associated channels can likewise be similarly applied to the engagement of the ring 72 with the rib 116 and the blade, the edge 118 of the ring in the slot 86 being thus provided with a circumferentially projecting element corresponding to the sealing strips 130 of Figs. 4, 6 and 7, whereby to effect a pressure sealing engagement between the ring 72 and the rib 116.

*Engine unit (Figs. 2, 10–13)*

The structure of the engine component of the device is in many respects similar to that of the compressor unit. Thus, the stator section 16 has an axial chamber providing a peripheral cylindrical cylinder wall 150. Rotatable upon the splines 78 of the shaft 12 is a core 152 which is similar to the core 76 of the compressor unit. There is thus provided an annular working chamber between the cylindrical convex surface 154 of the core 152 and the concave cylindrical surface 150 of the stator. Received in this annular working chamber and movable rotatably therethrough is a rotary piston or ring designated generally by the numeral 156 and which is substantially identical with the rotary piston of the pump unit, consisting of a cylindrical ring or band 158 supported by circular support plates 160 by means of bearing assemblies 162 each carried upon eccentrics 164 which are splined upon the shaft. The support plates as in the preceding embodiment are rigidly attached to the band 158 as by bolts 159. The rings 158 are slotted as at 166 and a blade 168, see Fig. 11, has a laterally enlarged upper portion 170 and a depending stem portion 172, the latter being received in the slot 166.

The stem portion 172 of the blade is guidingly and slidingly received in radially disposed slot 174 formed in the core, while the enlarged upper end 170 of the blade is received in a similar slot 176 provided in the stator.

The blade is likewise provided with a semi-cylindrical transverse projection or rib 178 which is received in a corresponding semi-cylindrical concave transversely extending channel, groove or seat 180 in one edge of the slot 166 of the ring.

The blade has a packing or sealing means substantially identical with that shown and described in connection with Figs. 4, 6 and 7 hereinbefore, being provided with vertical slots 182 opening upwardly from the convex lower surface 184 of the portion 170 of the blade which overhangs its stem, and sealing elements in the form of plates or strips 186 are slidable in theses slots, having convex lower surfaces 188. Transverse bores or passages 190 communicate with the upper end of these slots and with channels or grooves 192. There are also provided laterally projecting pins 194 on the stem which are received in corresponding bores 196 in the support plates 160. In addition, the engagement of the ring 156 with the rib 178 and the blade may be likewise provided with a pressure operated sealing element such as that referred to in connection with the rib 116 of the blade and ring assembly 72 and 94 of Figs. 3 and 5.

It will now be understood that the blade construction of the engine component is identical with that of the compressor component. However, the blade 168 of the engine component is provided with a somewhat different port arrangement for the passage of fluid therethrough.

Thus, the blade 168 is provided with a single bore vertical or longitudinal 198 extending throughout the entire length of the blade from the top to the bottom thereof whereby the lower end of the slot 174 in the core and the upper end of the slot 176 in the stator are in continuous and free communication with each other through the bore 198 thereby preventing any possible dashpot effect which might interfere with reciprocation of the blade in these slots; and also serving for the inlet of a combustible mixture into the working chamber B as set forth hereinafter.

Figure 12:
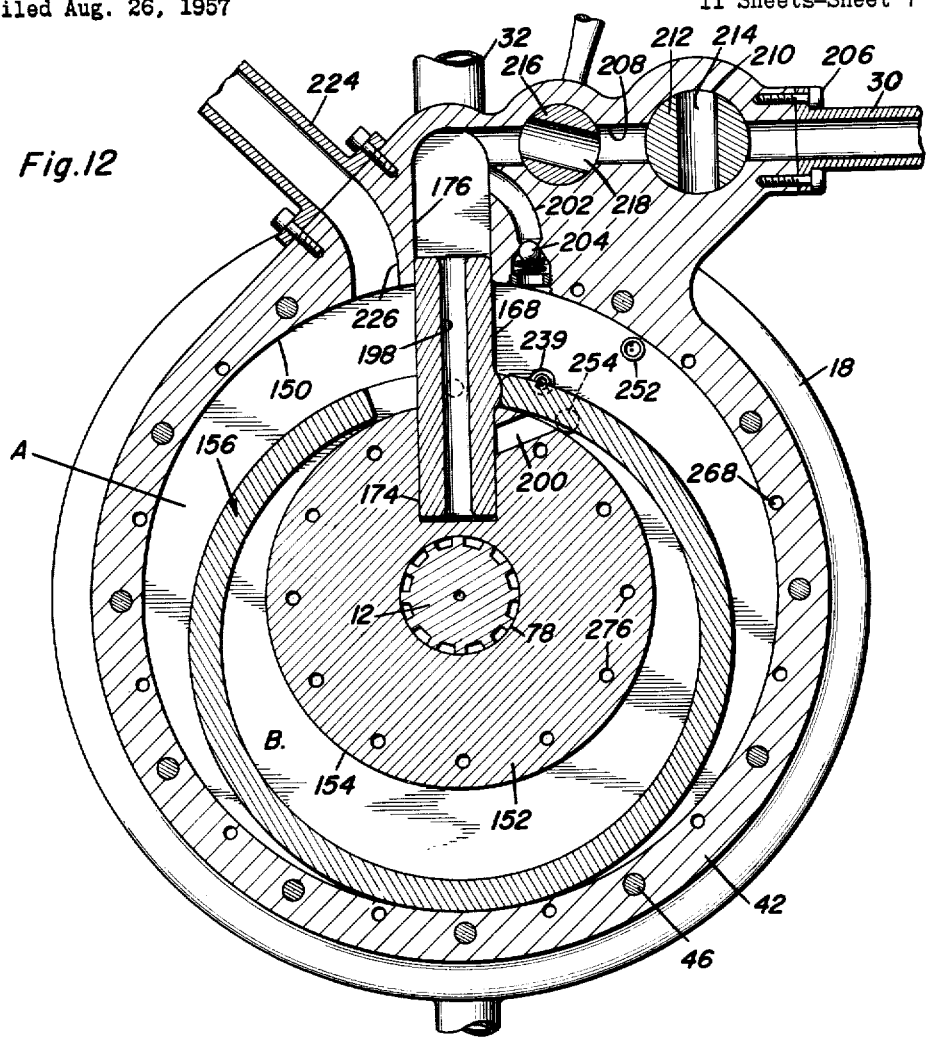
Figure 12 is a view similar to Figure 10 but showing the position of the parts at 180° from the showing of Figure 10.
Figure 13:
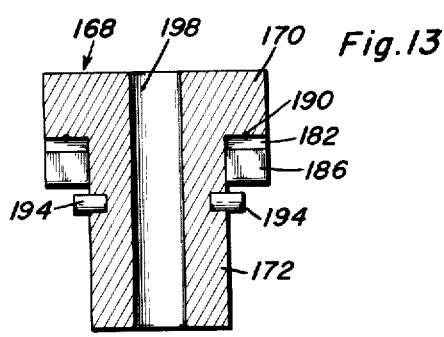
Figure 13 is a vertical transverse sectional view taken substantially upon the plane indicated by the section line 13—13 of Figure 11.

Referring now to Figs. 10 and 12 it will be seen that there is provided a combustible mixture intake passage 200 extending into the core 152 from the inner chamber B and which opens into the slot 174 below the lower end of the stem portion 172 of the blade when the latter is in its raised or upper position as in Fig. 10. There is provided at the right side of the blade 168 a further fuel mixture inlet passage or port 202 in the stator whose outlet end communicates with the outer working chamber A adjacent to the blade and is provided with a non-return downwardly opening check valve assembly as at 204. The inlet end of this passage 202 communicates with the top of the slot 176 in a position to be controlled by the upper end of the blade, as will be apparent from a comparison of Figs. 10 and 12. If desired, non-return valves, not shown, of any conventional character, may be employed in the inlet passages 200 or 202 or both to prevent back flow of combustion products therethrough.

By means of fastening screws 206, the end of the conduit 30 is secured to a suitable seat upon the stator with the conduit registering with a passage 208 which communicates with the top of the slot 176. Disposed in a cylindrical valve chamber 210 which intersects or is interposed in the passage 208 is a rotary valve member 212 having a diametrically extending intake passage or port 214. This valve is suitably connected through its valve stem 62 with the previously described driving means 60 whereby rotation of the valve in timed relation to travel of the rotary pistons will be effected.

A manual control valve 216 having a diametrically disposed port 218 therein is also disposed in a cylindrical valve chamber or seat 220 in the previously mentioned passage 208 between the valve body 212 and the slot 176. This last mentioned valve is provided with a handle 222 whereby the flow of fluid from the accumulator tank 24 and/or the carburetor 28 may be manually shut-off, or may be adjustably opened as will be apparent from Figs. 10 and 12.

An exhaust conduit 224 is secured in registration with an exhaust port 226 as by means of fasteners 228, and directly communicates with the annular working chamber A at the left side of the blade 168.

In operation, a combustible mixture is supplied by means of the conduit 30 through the automatically timed and operated valve 212 and through the manual cut-off valve 216 to the upper end of the slot 176. From thence it is supplied at the appropriate time in the cycle of operation depending upon the position of the blade in its slots, either to the passage 202 whereby the outer working chamber A is charged or by the passages 198 and 200 to the inner working chamber B whereby the latter is charged. Exhaust from both of the working chambers A and B is discharged through the port and passage 226 and 224.

In addition in order to obtain a substantially uniform working pressure throughout the relatively long working stroke of the engine component, there are provided means for effecting a plurality of successive injections of fuel into the outer working chamber, means for successively igniting the additional injections of fuel, and means for successively and supplementally exhausting the combustion products therefrom. Thus, there are provided successive circumferentially spaced fuel injection nozzles 230, 232 and 233 of any suitable character, operated as by control cams 234, 236 and 237. Successive exhaust valves 240, 242 and 244 communicate with the outer chamber A under the control of suitable operating means such as the cams 246, 248 and 250. A similar fuel injector 239 is provided for the inner chamber B.

Ignition is effected as by spark plugs diagrammatically indicated at 252 in the outer chamber and 254 in the inner chamber, while the successively injected charges of fuel in the outer chamber are ignited as by the spark plugs 256 and 258.

It will be understood that any suitable injection valves, exhaust valves and ignition means are provided for injecting the supplemental or additional charges, for exhausting the previously burnt gases and for igniting the additional charges. Inasmuch as the invention claimed herein can make use of any conventional type of injectors, exhaust valves and ignition systems for this purpose, a detailed explanation as to the same is deemed to be unnecessary.

The embodiment of Figs. 10-13 as hereinbefore described employs a spark ignition system for combustion. The same construction, however, can be readily operated upon the diesel cycle of operation. For this mode of operation, the spark plugs 252, 254, 256, 258 and their associated electrical system are not required and will be omitted.

The fluid or air compressor unit 14 would be charged by a conventional supercharger, not shown, forcing air through the port 144 with the compression chambers of the compressor unit which thus further compresses this air and delivers it by the conduit 26 into the accumulator tank 24. Since the carburetor 28 is omitted as unnecessary to the diesel cycle of operation, the super compressed stored air from the tank 24 is delivered into the engine unit 18 through the rotary valve 212 and the control valve 216 into the upper portion of the slot 176 from whence it flows through channel 202 and the passage 198 of the blade 168 into the working chambers A and B respectively.

Fuel is injected into the super compressed air in the chambers A and B by the fuel injectors 230, 232, 233 and 239, where in the full diesel cycle of operation it is ignited by the compression pressure. However, a starting igniter could be employed to initiate combustion or even a fuel similar to gasoline could be utilized both to facilitate starting or for warm-up purposes. Since such starting devices are in themselves well known, and the invention disclosed and claimed herein is not dependent thereon, illustration of the same is omitted as superfluous.

Cooling and lubricating system

As referred to generally hereinbefore there is provided a combined cooling and lubricating system for this apparatus. From a reservoir 18 the coolant and lubricant is discharged to a cooling radiator 20, and from thence by means of the pump 22 is then circulated through the interior of the apparatus for cooling and lubricating the same. As shown diagrammatically in Fig. 1, the discharge from the cooling and lubricating pump 22 goes by means of conduits or pipes 260 and 262 to the end walls 42 and 40, respectively, of the engine and pump components of the device, as shown in Fig. 2.

Upon passing through the end walls 42 and 40, the combined coolant and lubricant enters an annular chamber disposed between these end walls and the support plates 160 and 80, respectively of the eccentrics of the two components of the device. From these annular chambers, the coolant and lubricant enters the radially disposed coolant passages 264 and 266 in the above mentioned end walls of the stator 10, and then enters the axially extending registering passages 268 and 270 in the circumferential walls of the stator sections 16 and 14, and then enters by the radially extending passages 272 in the partition wall 44, into the annular chamber disposed between the support plates 80 and 160 of the two units, and finally enters the reservoir 18 extending circumferentially about the casing. From the reservoir, the coolant fluid is then returned to the radiator as will be readily apparent.

In addition to the cooling passages 264, 266, 268 and 270 and 272 in the stator, the coolant also passes through the cores 76 and 152. For this purpose, each core is provided with a plurality of axially extending passages disposed adjacent the periphery of the cores, the passages in the core 76 being shown at 274, while those for the core 152 are shown at 276.

It will thus be apparent that a single fluid is circulated throughout this apparatus to thus lubricate the moving parts thereof and also to effectively cool the device.

Operation of rotary pistons (Figs. 14–21)

Figs. 14–21 are sequential views diagrammatically illustrating at 45° intervals the rotation of the rotary pistons of both the pump unit and the engine unit of the device, about the cores 76 and 152, to thus effect the cyclic expansion and contraction of the outer and inner working chambers of each unit. This geometry of movement, with the ring or rotary piston 72 or 156 remaining tangent on its outer and inner surfaces with the inner wall of the stator and the exterior wall of the core is identical for both the pump and engine components. In all of the sequential views, the blades either 94 or 168 remain stationary in the vertical position shown at 0° in Fig. 14 and constitute therefore one end wall of each of the working chambers A and B.

Inasmuch as the cyclic operation is the same for both the pump component and the engine component, the reference numerals applied in the diagrammatic views of Figs. 14–21 are those for the pump unit, it being understood that the description given with respect thereto is equally applicable to the engine component and therefore need not be repeated.

As will be seen from the series of views in Figs. 14–21, the support plates and eccentric revolve in the direction indicated by the arrow and the rotary piston or ring 72 carried thereby has both an oscillating motion as well as a vertical movement, so that its outer convex and its inner concave surfaces have their tangency with the stator and with the core revolving therein and thereabout. As shown by the successive 45° views, in the cycle of operation, this relative movement of the ring or rotary piston with respect to the core and stator results in an expansion and contraction of the inner and outer working chambers A and B, respectively.

In these views, the shaded portions represent the working chambers or sections thereof which are receiving a charge of fluid, while the unshaded portions designate those chambers or sections of chambers which are exhausting their charges.

Figure 14:
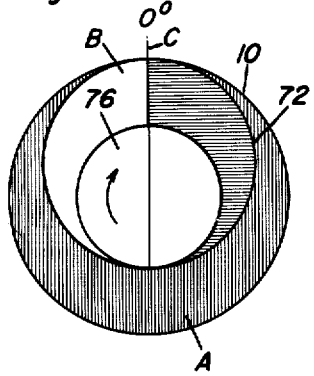
Figures 14–21 are sequential diagrammatic views illustrating successive stages in the rotation of the rotary piston of either the compressor component or the engine component of the device and illustrating the manner in which the two concentric chambers of the compressor or engine expand and contract during one revolution of the rotary piston.

In Fig. 14, the longitudinal axis C of the eccentric is shown at its top vertical position or at 0°. The tangency of the top of the ring 72 with the stator casing 10 thus forms the outer chamber A extending substantially entirely from one side of the blade to the other as shown in the shaded lines in Fig. 14. The tangency of the bottom of the ring with the core 76 defines the inner chamber B which is divided by the blade and by the point of tangency into two substantially equal sections, each extending from the point of tangency to the opposite sides of the blade, that at the right of the blade being shaded to designate the condition of charging, while that at the left of the blade is unshaded to indicate the condition of exhausting.

Figure 15:
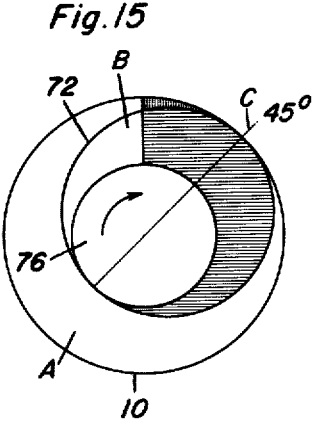
Figure 16:
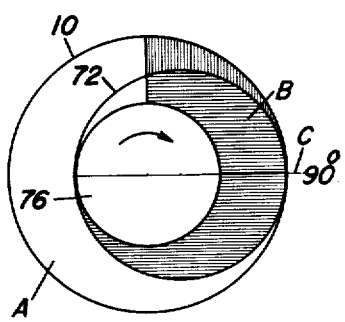
Figure 17:
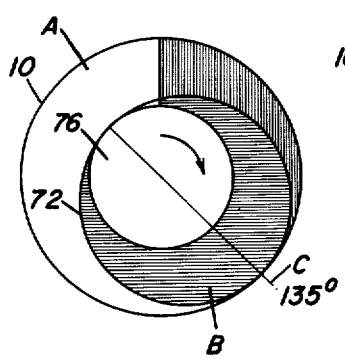
Figure 18:
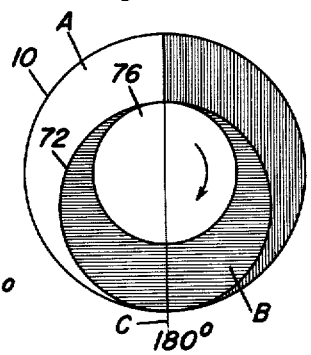
Figure 19:
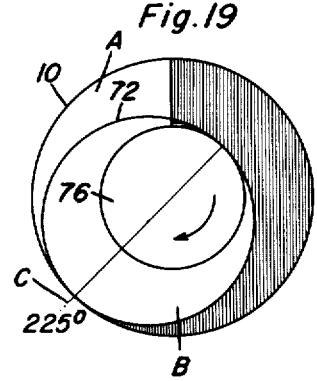
Figure 20:
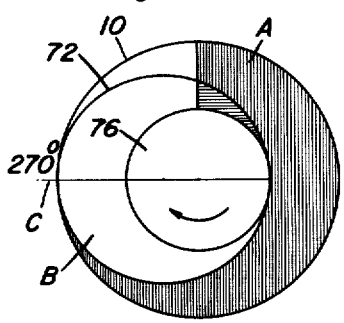
Figure 21:
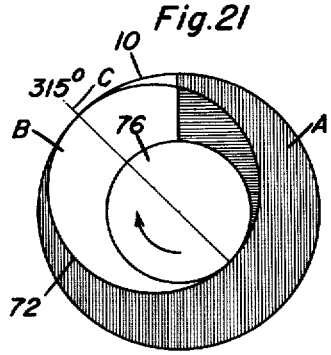

In Fig. 15 is shown the next successive 45° rotational position of the ring, the point of tangency C being now positioned at a 45° angle with respect to the blade. Similarly, each successive figure shows a further 45° travel of the point of tangency of the ring with the stator and the core, and the shaded and unshaded areas disclose the relative volumes of the outer and inner working chambers which are undergoing intake and exhaust.

Although the cyclic operations differ, the actual expansion and contraction of these chambers, by the movement of the rotary piston or ring is identical.

*Operation of compressor unit (Figs. 22-29)*

The operation of the compressor or pump component of the device, as embodied in Figs. 2-9, is illustrated diagrammatically in the sequential views of Figs. 22-29.

In Fig. 22 the inner pump chamber B is intaking a charge from the intake passage 144 as shown by the arrows, in the right hand portion of the chamber, while the left hand portion of the chamber is exhausting through the passage 112. The outer chamber A is just closing its intake by engagement of the edge of the ring 72 with the stator wall of the section 14, while the left side of this outer chamber has just closed its exhaust by the lower end of the ring contacting the stator inner wall.

In the succeeding position assumed by the parts in Fig. 23, it will be observed that the ring 72 has now engaged the stator wall thus positively closing the outer chamber A from the intake port, and the incoming charge is now filling the inner pump chamber B at the right side thereof. The exhaust port through the vane above the ring is just beginning to open in the left side portion of the outer chamber, and the left side portion of the inner chamber is exhausting through the port 112 as previously mentioned.

In the further succeeding position of Fig. 24, it will be observed that the outer chamber is now pushing its charge around towards the exhaust port, while the right side of the inner chamber B continues to intake a charge. The left side of both the outer and inner chambers A and B are now exhausting through the two ports opening into the vane or blade 94.

In the next cyclic position of Fig. 25 it will be observed that the right side of the outer chamber A is beginning to intake, while the right side of the inner chamber B continues to intake; the left side of the inner chamber having now substantially completed its exhaust stroke, while the left side of the outer chamber is continuing to exhaust.

In the succeeding position of Fig. 26 it will be observed that the right side of the inner chamber has continued to intake so that substantially the entire inner chamber is now filled with a charge, while the outer chamber is now well advanced upon its intake stroke. The left side of the inner chamber has now closed its exhaust port so that the inner chamber is ready to begin compressing, while the left side of the outer chamber is now entering the last portion of its exhaust stroke.

In the next succeeding position of the parts shown in Fig. 27, the right side of the outer chamber is continuing with its intake, while the left side thereof is continuing its exhaust. The ring has now closed the intake of the inner chamber, so that this chamber is compressing, while the left hand side of the same is about to begin its exhaust stroke.

In the next position of the parts shown in Fig. 28, it will be seen that the inner chamber is now exhausting, while its intake remains closed, the left portion of the outer chamber is completing its exhaust stroke, while the right side thereof continues its intake stroke.

In the final position of Fig. 29, the left side of the outer chamber has now finished its exhaust stroke, and the right side thereof has continued its intake stroke. The right side of the inner chamber is just beginning its intake, while the left side is continuing its exhaust. After the position of Fig. 29, the parts assume the position of Fig. 22 and the cycle of operation is then repeated.

*Operation of engine unit (Figs. 30-34)*

The engine unit 16 is capable of operation both as a carburetor type of gas engine and as a diesel type engine. Its operation as a carburetor type engine has been specifically illustrated in Figs. 30-34 and will be now described.

Starting with the position of Fig. 30 it will be seen that as the piston 156 moves clockwise the outer chamber A is completing its power stroke, the left hand portion of the inner chamber B is exhausting, while the right hand portion of B is starting its working stroke.

In Fig. 30, the exhaust port 226 is still closed by the piston 156 to the outer chamber A, in which plural or successive charges of fuel from the injectors 230, 232 and 233 or any desired number of additional injectors have been fired by the igniters 256, 258 or others as desired, while the auxiliary exhaust valves 240, 242, 244 or others have exhausted combustion products from their portions of the chamber A. Where desired the fuel injectors, the igniters or the auxiliary exhausts may function simultaneously.

The left side of inner chamber B in Fig. 30 is exhausting through the exhaust passage 226. The right side of chamber B is beginning its power stroke, receiving a combustible mixture from the passages 208, 176, 198, 174 and 200 which is ignited by the spark plug 254. This explosion moves the piston to the position of Fig. 31.

In the position of Fig. 31, the outer chamber A is freely exhausting through the exhaust passage 226 and the left side of chamber B is completing its exhaust thereto. The right side of inner chamber B is continuing its working stroke, the downward movement of the blade 168 in its slot 174 having now closed the inlet port 200. If desired, an additional fuel charge may be injected by the fuel injector 239 and ignited by the spark plug 254.

In Fig. 31, the right side of the outer chamber A is receiving a combustible mixture from the port 202 which is now uncovered by the top of the blade 168 as the latter moves downwardly in its slot 176, this fuel being ignited by the spark plug 252. The combined thrusts of the right side of chambers A and B move the ring to the position in Fig. 32.

In Fig. 32, the exhausting of the left side of the inner chamber B is now completed and the right side of chamber B has expanded to its maximum volume. The left side of outer chamber A is continuing its exhaust through the passage 226. The right side of chamber A is continuing its intake of fuel mixture from the passage 202 and from the auxiliary injectors 230 and 232. The incoming fuel mixture from 202 pushes the burnt gases ahead of it to scavenge them through the auxiliary exhaust port 240 which then closes and the fresh incoming charge is ignited by the spark plugs 252 and 256 thereby continuing combustion and maintaining the working force on the piston. The latter is thereby rotated to the position of Fig. 33.

In Fig. 33, the left side of the outer chamber A is approaching the completion of its exhaust stroke while the inner chamber B is now open to the exhaust passage 226 through the outer chamber A and is beginning its exhaust. The right side of outer chamber A has its auxiliary exhaust ports 240, 242 and 244 opened simultaneously to allow scavenging and exhaust of the burnt gases therethrough by the incoming fresh combustible mixture from the passage 202 and auxiliary fuel injections through the injectors 230, 232, 234 and ignited by the spark plugs 252, 256, 258 to maintain combustion and the working stroke.

When the piston 156 moves to the position of Fig. 34, the left side of outer chamber A is finishing its exhaust stroke while the left side of inner chamber B is continuing its exhaust. The right side of chamber A is nearing the end of its working stroke, as the blade 168 is moving up to cut off the fuel mixture inlet to the passage 202 and the lower end of the blade 168 is moving up to open the inlet passage 200 into the right side of the inner chamber B which is about ready to start its next working stroke.

From the foregoing it will be seen that both the outer and inner chambers A and B contribute towards the development of power for moving the ring piston 156. Further, there is a successive and continuing fuel injection, firing and scavenging in the outer chamber A which prolongs the effective power or working stroke throughout a very great part of the rotation.

Where it is desired to use the engine upon the diesel cycle of operation, the passage 208 is used to supply only compressed fresh air without fuel. The latter is introduced by the fuel injectors 230, 232, 233, 239 with the spark plugs 252, 254, 256, 258 being omitted in favor of compression ignition.

In some instances, it may be desired to start and warm up the device as a carbureted gasoline engine in the manner described hereinbefore and thereafter convert to the full diesel cycle by cutting out the carbureted charge supply and the spark plug ignition system by any conventional mechanism.

Figure 35:
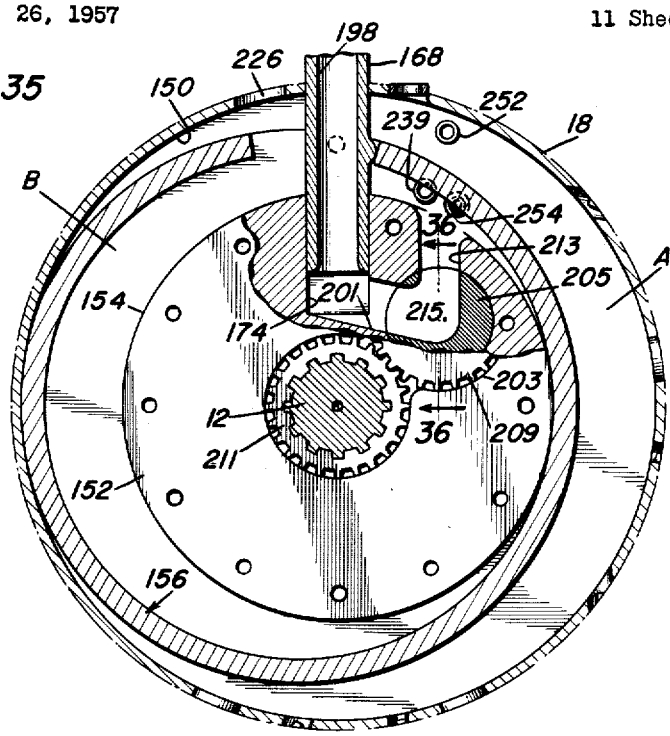
Figure 35 is a sectional view similar to Figure 10 but showing a construction of the engine compartment having a valve controlled inlet port, parts being omitted and other parts being broken away and shown in section.
Figure 36:
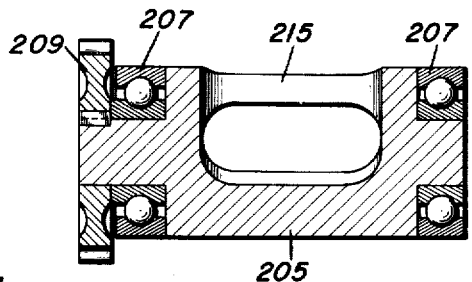
Figure 36 is a vertical longitudinal sectional view through the rotary inlet control valve, being taken on an enlarged scale and upon the plane indicated by the section line 36—36 of Figure 35; and, Figure 37 is an elevational view of the valve of Figures 35 and 36.
Figure 37:
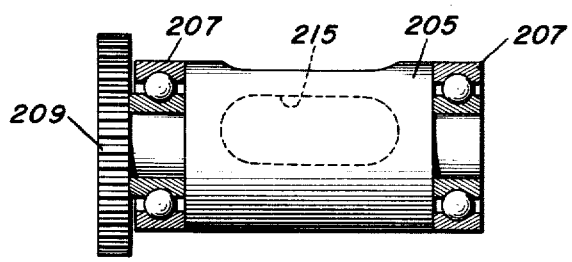

*Modification of Figures 35–37*

Figs. 35–37 show a modified valve for positively timing the flow of air or a fuel-air mixture into the inner chamber B of the engine unit and which may in some instances be preferred to the passage 200 and its control by the lower end of the blade 168 in its slot 174.

Fig. 35 designates the same engine unit as that of Figs. 10–13, except for the changes hereinafter set forth, and the same numerals are employed to designate the same elements as those shown and described in connection with Figs. 10–13. In the interest of simplicity of illustration, the auxiliary injectors, spark plugs, auxiliary exhaust valves, their operating mechanisms and portions of the stator have been omitted, since the omitted parts are all identical as to structure and operation with those of Figs. 10–13.

The blade controlled passage 200 of Figs. 10 and 12 is replaced by a passage 201 in the core 152 opening from the bottom of the slot 174 so that it always is in free and continuous communication with the latter and with the air or mixture supplied by the bore 198 of the blade 168.

The passage 201 communicates with a valve chamber 203 in which is journaled a rotary valve 205 comprising a cylindrical body journaled in bearings 207 and having secured thereto a driving gear 209. The latter is driven by the shaft 12 in timed relation and in any suitable manner, as by engagement with a driving gear 211 splined on this shaft.

A delivery passage 213 extends in the core 152 from the valve chamber 203 to the exterior surface of the core and opens into the inner working chamber B adjacent the spark igniter 254 and/or the auxiliary injector 239. It will thus be apparent that the valve with its valve passage 215 therethrough controls flow through the passages 201, 213 whereby air or a combustible fuel mixture may be supplied to the right hand side of the inner working chamber B in timed relation to movement of the ring piston 156.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An internal combustion engine comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston therein between concentric inner and outer working chambers in said annular chamber, said ring having an opening receiving said blade therethrough, means supporting said rotor for epicyclic movement in said annular chamber in tangency with the stator and core, said support means including a pair of plates fixedly secured to and supporting said ring at opposite sides thereof, journals for said plates, intake means for supplying and means for igniting combustible charges into and exhaust means for exhausting combustion products from said inner and outer working chambers.

2. An internal combustion engine comprising a stator having a central opening therein with a core disposed centrally of said opening and defining with said stator an annular chamber, a blade extending across said annular chamber from said core to said stator and providing a partition therebetween, a rotor in said annular chamber including a ring surrounding said core and providing a rotary piston therein between concentric inner and outer working chambers in said annular chamber, said ring having an opening receiving said blade therethrough, means supporting said rotor for epicyclic movement in said annular chamber in tangency with the stator and core, intake means for supplying and means for igniting combustible charges into and exhaust means for exhausting combustion products from said inner and outer working chambers, being mounted in slots in said stator and in said core for reciprocating motion, said ring being in continuous pivoting engagement at one edge of the ring opening with one side of said blade whereby said blade has sliding movement with said ring and pivotal movement thereon.

3. The combination of claim 1, wherein said intake means includes communicating passages in said stator, blade and core for supplying a combustible mixture into said inner chamber, said blade having a slidable engagement with said stator and core.

4. The combination of claim 1, wherein said inner chamber exhausts into said outer working chamber and said exhaust means communicates with said outer working chamber, 5. An internal combustion engine comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston therein between concentric inner and outer working chambers in said annular chamber, said ring having an opening receiving said blade therethrough, means supporting said rotor for epicyclic movement in said annular chamber in tangency with the stator and core, intake means for supplying and means for igniting combustible charges into and exhaust means for exhausting combustion products from said inner and outer working chambers, alined slots in said stator and core, said intake means communicating with the slot in the stator, a first inlet passage connecting the slot in the stator with said outer working chamber, a second inlet passage connecting the slot in the core with said inner working chamber, said blade being slideably mounted in both said slots, a third intake passage extending through said blade and communicating with both said slots.

6. The combination of claim 6, wherein said blade comprises a valve controlling flow of combustible mixture through one of said intake passages.

7. The combination of claim 1, including means for effecting successive introductions of a combustible mixture in one of said working chambers and further valve means for effecting successive ignitions of combustible mixture in said one working chamber whereby to continue and prolong the working pressure during the power stroke in said working chamber.

8. The combination of claim 7, including additional valve means for effecting successive discharge of combustion products from said one working chamber.

9. An internal combustion engine comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston therein between concentric inner and outer working chambers in said annular chamber, said ring having an opening receiving said blade therethrough, means supporting said rotor for epicyclic movement in said annular chamber in tangency with the stator and core, intake means for supplying and means for igniting combustible charges into and exhaust means for exhausting combustion products from said inner and outer working chambers, alined slots in said stator and core, said intake means communicating with the slot in the stator, a first inlet passage connecting the slot in the stator with said outer working chamber, a second inlet passage connecting the slot in the core with said inner working chamber, said blade being slideably mounted in both said slots, a third intake passage extending through said blade and communicating with both said slots, one of said inlet passages having a non-return valve.

10. The combination of claim 1 wherein said stator has axially extending bores therethrough disposed in circumferentially spaced relation and adjacent the periphery thereof, means for circulating a coolant through said bores.

11. The combination of claim 1, wherein said core has axially extending bores therethrough disposed in circumferentially spaced relation and adjacent the periphrey thereof, means for circulating a lubricant through said bores.

12. An expansible chamber device comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston dividing said annular chamber into concentric inner and outer working chambers, said ring having an opening receiving said blade therethrough, said stator and core having slots receiving said blade for sliding movement therein, means rotatably supporting said rotor including a pair of plates received in said ring and fixedly secured to the opposite sides thereof, means causing epicyclic movement of said rotor in said annular chamber in tangency with said stator and core including eccentric journals supporting said plates, means pivotally attaching said ring to said blade for sliding movement therewith and for pivotal movement thereon, intake means for each of said working chambers, exhaust means for said working chambers in said blade.

13. An expansible chamber device comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston dividing said annular chamber into concentric inner and outer working chambers, said ring having an opening receiving said blade therethrough, said stator and core having slots receiving said blade for sliding movement therein, means rotatably supporting said rotor, means causing epicyclic movement of said rotor in said annular chamber in tangency with said stator and core, means pivotally attaching said ring to said blade for sliding movement therewith and for pivotal movement thereon, intake means for each of said working chambers, exhaust means for said working chambers in said blade, said blade having a longitudinal bore therein communicating with the slot in said stator and communicating with one of said working chambers, said bore comprising part of said exhaust means.

14. An expansible chamber device comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston dividing said annular chamber into concentric inner and outer working chambers, said ring having an opening receiving said blade therethrough, said stator and core having slots receiving said blade for sliding movement therein, means rotatably supporting said rotor, means causing epicyclic movement of said rotor in said annular chamber in tangency with said stator and core, means pivotally attaching said ring to said blade for sliding movement therewith and for pivotal movement thereon, intake means for each of said working chambers, exhaust means for said working chambers in said blade, said blade having a pair of longitudinal bores therein each communicating with said slot in said stator, said bores each having communication with a working chamber on opposite sides of said ring, said bores comprising part of said exhaust means.

15. An expansible chamber device comprising a stator having a central opening therein with a stationary core disposed centrally of said opening and defining with said stator an annular chamber, a blade extending across said annular chamber from said core to said stator and providing a partition therebetween, a rotor in said annular chamber including a ring surrounding said core and providing a rotary piston dividing said annular chamber into concentric inner and outer working chambers, said ring having an opening receiving said blade therethrough, said stator and core having slots receiving said blade for sliding movement therein, means rotatably supporting said rotor, means causing epicyclic movement of said rotor in said annular chamber in tangency with said stator and core, means pivotally attaching said ring to said blade for sliding movement therewith and for pivotal movement thereon, intake means for each of said working chambers, exhaust means for said working chambers in said blade, said intake means including communicating passages in said stator, blade and core for supplying a combustible mixture into said inner chamber, a rotary valve journaled in said core for controlling flow through said passages, means for operating said rotary valve in timed relation to operation of said ring.

16. An internal combustion engine comprising a stator having a central opening therein with a core disposed centrally of said opening and defining with said stator an annular chamber, a blade extending across said annular chamber from said core to said stator and providing a partition therebetween, a rotor in said annular chamber including a ring surrounding said core and providing a rotary piston therein between concentric inner and outer working chambers in said annular chamber, said ring having an opening receiving said blade therethrough, means supporting said rotor epicyclic movement in said annular chamber in tangency with the stator and core, intake means for supplying and means for igniting combustible charges into and exhaust means for exhausting combustion products from said inner and outer working chambers, including alined slots in said stator and core, said intake means communicating with the slot in the stator, a first inlet passage connecting the slot in the stator with said outer working chamber, a second inlet passage connecting the slot in the core with said inner working chamber, said blade being slidably mounted in both said slots, a third intake passage extending through said blade and communicating with both said slots, a rotary valve journaled in said core for controlling flow through said passages, means for operating said rotary valve in timed relation to operation of said ring.

17. An expansible chamber apparatus comprising a stator having a central opening therein with a stationary core disposed centrally of said opening and defining an annular chamber between said core and stator, alined sockets in said core and stator, a blade extending across said annular chamber providing a partition thereacross and having its ends slidably received in said sockets, a ring surrounding said core and dividing said annular chamber into concentric working chambers, means for supporting said ring for epicyclic movement in said annular chamber and maintaining said ring tangent to said stator and core, said ring having an opening receiving said blade therethrough, said stator having fluid inlet means and fluid discharge means each communicating with said annular chamber, said blade having a passage therethrough having continuous communication with one of said fluid means, said core having a passage communicating with the blade passage and with the innermost of said concentric working chambers.

18. The combination of claim 17 including a valve control flow of fluid through said core passage, means operating said valve in positive timed relation to the position and movement of said ring.

19. The combination of claim 17 including a second fluid passage in said stator, the adit of said second passage communicating with said stator socket and its exit communicating with the outermost of said concentric working chambers.

20. The combination of claim 17 including a second fluid passage in said stator, the adit of said second passage communicating with said stator socket and its exit communicating with the outermost of said concentric working chambers, said adit being positioned in said stator socket for opening and closing by the reciprocation of said blade in said stator socket.

21. The combination of claim 17 wherein said core passage has an adit in the core socket which is positioned for opening and closing by the blade reciprocating in said core socket.

22. The combination of claim 17 wherein said ring pivotally engages one side of said blade at one edge of said ring opening for movement of said ring with said blade.

23. The combination of claim 17 wherein said ring pivotally engages one side of said blade at one edge of said ring opening for movement of said ring with said blade, the other edge of said ring opening being spaced from the other side of said blade and providing an exhaust passage from the inner to the outer of said concentric working chambers.

24. The combination of claim 17 including a second fluid passage in said stator, the adit of said second passage communicating with said stator socket and its exit communicating with the outermost of said concentric working chambers, the stator second passage and said core passage having adits respectively communicating with the stator and core sockets, said adits being disposed for opening and closing by the reciprocation of said blade in said sockets.

References Cited in the file of this patent

UNITED STATES PATENTS

| | | |
|---|---|---|
| 874,616 | Oakman | Dec. 24, 1907 |
| 973,833 | Wilber | Oct. 25, 1910 |
| 1,473,656 | Wagenhorst | Nov. 13, 1923 |
| 1,773,635 | Simmons | Aug. 19, 1930 |
| 1,906,142 | Ekelof | Apr. 25, 1933 |
| 1,919,355 | Bancroft | July 25, 1933 |
| 2,073,101 | Fox | Mar. 9, 1937 |
| 2,799,253 | Lindhagen et al. | July 16, 1957 |

FOREIGN PATENTS

| | | |
|---|---|---|
| 361,030 | Great Britain | Nov. 19, 1931 |
| 537,527 | France | Mar. 6, 1922 |
| 597,941 | Germany | June 1, 1934 |